United States Patent
Masclet et al.

(10) Patent No.: US 6,973,387 B2
(45) Date of Patent: Dec. 6, 2005

(54) NAVIGATION AND DEVICE FOR MOTOR VEHICLE

(75) Inventors: Sophie Masclet, Sevres (FR); Nicolas Verhaeghe, Rambouillet (FR)

(73) Assignee: Bouygues Telecom, (FR)

( * ) Notice: Subject to any disclaimer, the term of this patent is extended or adjusted under 35 U.S.C. 154(b) by 0 days.

(21) Appl. No.: 10/473,837

(22) PCT Filed: Apr. 2, 2002

(86) PCT No.: PCT/FR02/01131

§ 371 (c)(1),
(2), (4) Date: Mar. 22, 2004

(87) PCT Pub. No.: WO02/080131

PCT Pub. Date: Oct. 10, 2002

(65) Prior Publication Data

US 2004/0148091 A1    Jul. 29, 2004

(30) Foreign Application Priority Data

Mar. 30, 2001 (FR) .................................. 01 04350

(51) Int. Cl.⁷ ...................... G08G 1/0968; G01C 21/36
(52) U.S. Cl. ................. 701/211; 701/200; 340/539.16; 704/275
(58) Field of Search ....................... 701/200, 211, 201, 701/209; 340/539.16, 996; 342/357.09, 357.1; 704/275

(56) References Cited

U.S. PATENT DOCUMENTS

| | | | |
|---|---|---|---|
| 4,827,520 A * | 5/1989 | Zeinstra | 701/1 |
| 6,381,535 B1 * | 4/2002 | Durocher et al. | 701/202 |
| 6,421,607 B1 * | 7/2002 | Gee et al. | 701/209 |
| 6,523,061 B1 * | 2/2003 | Halverson et al. | 709/202 |
| 6,535,743 B1 * | 3/2003 | Kennedy et al. | 455/456.1 |
| 6,650,997 B2 * | 11/2003 | Funk | 701/207 |
| 6,721,633 B2 * | 4/2004 | Funk et al. | 701/1 |
| 6,738,914 B2 * | 5/2004 | Christopher | 713/323 |
| 6,804,330 B1 * | 10/2004 | Jones et al. | 379/88.01 |

FOREIGN PATENT DOCUMENTS

| | | |
|---|---|---|
| EP | 0803852 | 10/1997 |
| FR | 3761837 | 10/1998 |
| WO | WO 00/74019 | 12/2000 |
| WO | WO 01/69928 A2 * | 9/2001 |

* cited by examiner

Primary Examiner—Michael J. Zanelli
(74) Attorney, Agent, or Firm—Blakely Sokoloff Taylor & Zafman

(57) ABSTRACT

An assistance device for a motor vehicle consisting of an on-board terminal and manual controller, and a remote processing center able to communicate with the terminal via a radiotelephone network. The remote processing center handles exchanges with the on-board terminal by recognizing user requests made verbally or by means of the manual controller, and sends information to the terminal.

11 Claims, 1 Drawing Sheet

NAVIGATION AND DEVICE FOR MOTOR VEHICLE

Figure 1:
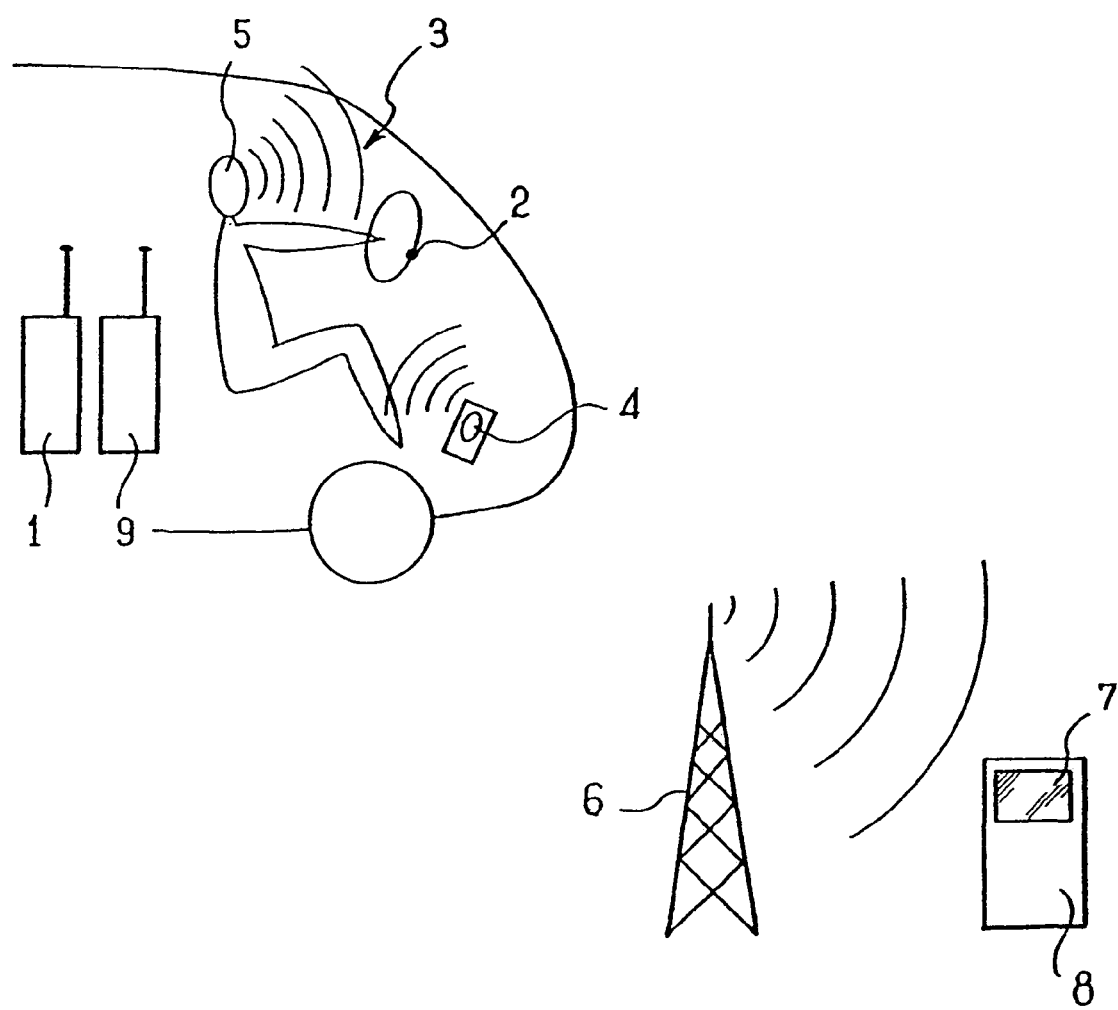

The present patent application is a non-provisional application of International Application No. PCT/FR02/01131, filed Apr. 2, 2002.

The invention relates to a device for providing the driver of a vehicle with assistance by using a mobile telephone network, in particular a cellular network of the GSM, GPRS, or UMTS type. The invention applies to all types of vehicle, both trucks and cars.

In particular, the invention proposes a device for providing navigation assistance.

Devices already exist for providing motor vehicles with navigation aid by using data obtained via a telephone network and processed by a navigation aid device on board the vehicle.

Document FR 2 761 837 describes a navigation aid device comprising a mobile terminal on board a vehicle and capable of communicating via a cellular radio-telephone network with an Internet server. The vehicle may be fitted with a localization system, for example a satellite position-identifying device. By means of the device, the driver can ask for various kinds of information from the Internet server. The special feature of the device described lies in the fact that the data and programs for controlling navigation aid are not originally stored in the appliance situated in the vehicle or with the person, but instead are conserved and updated as often as possible in one or more Internet servers. Unlike a self-contained on-board system, that device therefore does not require any itinerary-calculating software to be installed in the vehicle.

One of the advantages of such a device is that the data and the programs for providing aid in navigation can contain a large volume of information that is distributed over a plurality of Internet servers. Consequently, the services offered to the motorists by such a device can be very diversified. Servers can include programs for controlling navigation aid and databases containing information about points of interest (POI), i.e. the locations of sites that may be of interest to the driver, such as the location of a service station, a hotel or a restaurant, a tourist site, for example, and also information of the type concerning weather, geography, or traffic conditions and the state of the road.

Another advantage is that the programs and databases that are used for navigation can be updated regularly, which does not apply to self-contained on-board navigation systems.

Document FR 2 761 837 provides for using an interface in the form of a graphics screen, a microphone, loudspeakers, and a keypad, where some requests can be formulated verbally by the driver. The problem posed by that system and by most existing navigation aid systems is that they require a keypad to be used or information and road maps to be read on a screen. This means that the driver cannot look at the road or keep both hands on the steering wheel while using the navigation system. In particular, for safety reasons, the user is generally obliged to stop the vehicle when programming the assistance device to inform it of a destination, for example, or to formulate various requests.

To mitigate that drawback, the invention proposes a device that makes it possible to keep down to a strict minimum the manipulations required of the driver in order to access assistance services. The device allows the driver to drive quite safely, exchanging information with a navigation assistance center that is remote from the vehicle.

To this end, the invention provides an assistance device for a motor vehicle, the device comprising firstly a terminal on board a vehicle and manual control means placed inside the vehicle and connected to said terminal, and secondly a remote processing center suitable for communicating with the on-board terminal via a radio-telephone network, said center being suitable for handling exchanges with said on-board terminal by means of a given protocol and including, in particular for this purpose, means for recognizing requests formulated verbally by the user and/or requests corresponding to the user actuating manual control means, and also means for sending information to the on-board mobile terminal, the device being characterized in that the manual control means comprise a control element which makes only a single type of actuation available to the user, the exchange protocol handled by the processing center enabling the user to dialog with said processing center only by actuating the control element and/or by formulating requests verbally.

In a particularly advantageous embodiment of the invention, the control element may be a knob on which the user or the vehicle driver presses. Such pressing automatically causes the terminal to be connected to the voice recognition and synthesis interface of the remote center. The interface for guiding the user delivers messages proposing various services that are available. The user accesses the service of interest by formulating a request in natural language or by using key words. The voice recognition interface enables the user's utterance to be recognized and interpreted and then to direct the request to the corresponding service.

It will be understood that this all-voice processing is particularly advantageous insofar as no manipulation is required on the part of the user.

Thus, the assistance device proposed by the invention is advantageously associated by the various characteristics below taken singly or in any feasible combination:

actuating the control element causes the mobile terminal to be put into communication with the remote center, user requests being requests formulated verbally by the user;

information is delivered to the user in the form of a voice message;

information is downloaded and stored in memory means on board the vehicle;

the device includes manual control means suitable for being actuated by the user to cause information stored in the memory means to be delivered in the form of a verbal message; and the manual control means are constituted by the control element.

Other characteristics and advantages of the invention appear further from the following description which is purely illustrative and non-limiting and should be read with reference to the accompanying FIGURE which is a diagram of a device in accordance with the principle of the invention.

In the FIGURE, the on-board terminal 1 comprises a control element 2 situated on the steering wheel of the vehicle or in the immediate vicinity thereof, a microphone 3 directed towards the driver, and loudspeakers 4. When the driver presses on the button 2, the mobile terminal establishes a connection via the mobile telephone network 6 with a voice recognition and synthesis platform 7 that is remote from the vehicle. The driver 5 requests a service in natural language and the platform recognizes the user's request and directs the user to various services in the remote center 8. The center handles requests and returns information in response. The information coming from the center is converted into voice messages by the platform 7 and transmitted via the network 6 to be issued to the driver over the loudspeakers 4. The vehicle also has a satellite positioning system 9 enabling its geographical position to be determined, which position can be communicated automatically to the center 8 by the on-board terminal.

In an implementation of the invention, the user or driver can be guided through the various services by means of a menu system, for example. When the driver makes a connection to the remote center by actuating the button 2, the voice synthesis interface 7 lists the various services available and the user selects and utters the service of interest. For example, the first menu may contain the following services:

road guidance;
traffic information;
breakdown assistance;
the locations of POIs;
telephone service;
end of transmission.

If the driver selects road guidance, the remote center 8 asks the driver 5 for the parameters needed to calculate an itinerary. The starting point of the vehicle can be acquired automatically by means of the positioning system 9, e.g. of the GPS type. The center also requests the driver to formulate criteria that are to be optimized when calculating the itinerary, such as distance traveled or time taken. The voice recognition and synthesis interface 7 causes a navigation aid program contained in the center 8 to be used and returns the result it calculates in the form of a voice message containing guidance instructions.

If the driver leaves the intended itinerary, rerouting can be triggered automatically. Under such circumstances, and throughout the duration of guidance, the on-board terminal 1 regularly informs the remote center 8 of the position of the vehicle as supplied by the GPS system 9. The center 8 detects any departure from the itinerary by comparing the position provided by the GPS positioning system 9 with the guidance data as calculated. Under such circumstances, the center 8 automatically instructs a new itinerary to be calculated to take account of the vehicle's position.

For reasons of economy, call durations should be short. It is therefore advantageous to make provision for the on-board terminal not to remain connected with the remote center throughout the duration of guidance. For this purpose, the guidance instructions are downloaded into memory means included in the on-board terminal 1 and the driver is immediately returned to the main menu. The driver can then decide to end the call. While traveling, the driver controls the rate at which guidance instructions stored in the memory means are played back by causing each instruction to be delivered whenever the button 2 is pressed or by the equipment having fast forward, rewind, and pause commands.

If the driver leaves the intended itinerary, rerouting can be requested by again actuating the control element 2, thus causing the terminal 1 to be put back into communication with the center 8 that is situated remotely from the vehicle.

After being connected to the remote center 8 by actuating the button 2, the driver can also select to use the telephone service, in which case all conventional telephone services are available such as making a call or consulting voice mail messages and managing such messages. Dialing can be performed by voice recognition. In which case the driver dictates the number to be called or asks to consult a telephone directory. The interface 7 recognizes the driver's speech and instructs the remote center 8 to put the terminal 1 into communication with the called party. To terminate a call, the user presses the button 2 which is situated close to the steering wheel.

Finally, the remote center 8 can send information to the terminal 1 stating that "Mr. X" would like to speak to the driver 5. A driver who wishes to answer will give a positive answer to a question of the type "Would you like to answer Mr. X?", and the remote center 8 will set up a connection between the terminal 1 and the caller. On the contrary, if the driver gives a negative answer, then the remote center 8 will cause a message to be sent to the caller stating that the called party is not available and will then connect the caller to a voice mail box to record a message. The driver 5 may also be informed by the remote center 8 that a new message has been received, and can then ask to read the message.

Finally, if on being connected to the remote center 8 the driver selects the breakdown assistance service from the main menu, then the center 8 puts the driver directly into communication with an assistance center. The remote center 8 automatically transmits a warning message to the assistance center including the identity (vehicle model and license plate number) and the location of the vehicle and sets up a connection between the user and the same center so as to enable the user to speak with an operator capable of contacting appropriate emergency organizations (ambulance, police, breakdown, etc.).

Other implementations of the invention are possible, for example it is possible to envisage that the voice recognition or synthesis interface is on board the vehicle. This configuration has the advantage that the driver can dialog with the on-board terminal even when it is not connected to the remote center.

As will have been understood, the device of the invention can be applied to most services that can be envisaged by means of telephony.

What is claimed is:

1. An assistance device for a motor vehicle, the device comprising firstly a terminal (1) on board a vehicle with manual control means placed inside the vehicle and connected to said terminal, and secondly a remote processing center (8) suitable for communicating with the on-board terminal via a radiotelephone network (6), said remote processing center being suitable for handling exchanges with said on-board terminal by means of a given protocol and including means (7) for recognizing requests formulated verbally by the user (5) and requests corresponding to the user actuating manual control means, and also means for sending information to the on-board mobile terminal, wherein the means (7) for recognizing requests formulated verbally include a voice recognition and synthesis platform and wherein the manual control means comprise a control element (2) which makes only a single type of actuation available to the user, the exchange protocol handled by the processing center (8) enabling the user to dialog with said processing center only by at least one of actuating the control element (2) and formulating requests verbally.

2. An assistance device for a motor vehicle according to claim 1 wherein actuating the control element (2) causes the mobile terminal (1) to be put into communication with the remote center (8), user requests being requests formulated verbally by the user.

3. An assistance device for a motor vehicle according to claim 1 or claim 2, wherein information is delivered to the user (5) in the form of a voice message.

4. An assistance device for a motor vehicle according to claim 3, wherein information is downloaded and stored in memory means on board the vehicle.

5. An assistance device for a motor vehicle according to claim 4, wherein it includes manual control means suitable for being actuated by the user to cause information stored in the memory means to be delivered in the form of a verbal message.

6. An assistance device for a motor vehicle according to claim 5, wherein the manual control means are constituted by the control element (2).

7. An assistance device for motor vehicles according to claim 1, wherein the actuator element is located on the steering wheel or in the immediate vicinity thereof.

8. A method of providing navigation assistance to a user in a motor vehicle in which a remote processing center (8) communicates with a terminal (1) onboard a vehicle via a radiotelephone network (6), manual control means placed in the vehicle being connected to the on-board terminal (1), the remote processing center (8) communicating with said on-board terminal by means of at least one of a given protocol and implementing recognition of requests formulated verbally by the user (5) and requests corresponding to the user actuating manual control means, and also transmitting information to the on-board terminal (1), wherein recognition of verbal requests is made by a voice recognition and synthesis platform (7) located in the remote processing center (8), the manual control means comprise a control element (2) which provides the user (5) with a single type of actuation, and the user dialogs with the processing center (8) only by at least one of actuating the control element (2) and formulating verbal requests.

9. A method of providing a motor vehicle with navigation assistance according to claim 8, wherein actuating the control element (2) causes the on-board terminal (1) and the remote center (8) to be put into communication, communication with the center then taking place by formulating verbal requests.

10. A method of providing a motor vehicle with navigation assistance according to claim 8, wherein instructions are delivered to the user in the form of voice messages.

11. A method of providing a motor vehicle with navigation assistance according to claim 8, claim 9 or claim 10, comprising the following steps:

the remote center (8) guides the user (5) through various service options by sending at least one voice message relating to a menu of services available;

the user (5) utters the service of interest;

the remote center (8) interprets the words uttered by the user and returns information to the user.

* * * * *